United States Patent (10) Patent No.: US 7,848,763 B2
Fournier et al. (45) Date of Patent: *Dec. 7, 2010

(54) METHOD FOR PULLING GEOGRAPHIC LOCATION DATA FROM A REMOTE WIRELESS TELECOMMUNICATIONS MOBILE UNIT

(75) Inventors: Andre F. A. Fournier, Poulsbo, WA (US); Allen A. Jahani, Bainbridge Island, WA (US); Michael S. Sawyer, Bainbridge Island, WA (US); Stephen M. Grant, Bainbridge Island, WA (US)

(73) Assignee: Airbiquity Inc., Seattle, WA (US)

( * ) Notice: Subject to any disclaimer, the term of this patent is extended or adjusted under 35 U.S.C. 154(b) by 162 days.

This patent is subject to a terminal disclaimer.

(21) Appl. No.: 12/370,062

(22) Filed: Feb. 12, 2009

(65) Prior Publication Data

US 2009/0149196 A1 Jun. 11, 2009

Related U.S. Application Data

(60) Continuation of application No. 11/559,811, filed on Nov. 14, 2006, now Pat. No. 7,509,134, which is a division of application No. 10/016,631, filed on Nov. 1, 2001, now Pat. No. 7,215,965.

(51) Int. Cl.
*H04B 7/185* (2006.01)
*H04W 24/00* (2009.01)
(52) U.S. Cl. .............. 455/456.1; 455/12.1; 455/456.2; 455/13.1
(58) Field of Classification Search .............. 455/456.1, 455/456.2, 456.4, 12.1, 13.1
See application file for complete search history.

(56) References Cited

U.S. PATENT DOCUMENTS 3,742,197 A 6/1973 Pommerening (Continued)

FOREIGN PATENT DOCUMENTS

CA 2242495 1/2000

(Continued)

OTHER PUBLICATIONS

PCT/US2009/056834 International Search Report and Written Opinion dated Dec. 30, 2009; 12 pages.

(Continued)

*Primary Examiner*—Tilahun Gesesse
(74) *Attorney, Agent, or Firm*—Stolowitz Ford Cowger LLP

(57) ABSTRACT

A method to remotely determine a location of a mobile unit without intervention by a user of the mobile unit is provided. The mobile unit may receive a location query, download location data from a GPS, and transmit the location data via a wireless telecommunications network. For example, a call center may initiate a location query using a voice channel call to the mobile unit. In addition, the mobile unit may select a mode of communication from a number of alternative modes of digital wireless communication based upon a determined characteristic of the transmission mode. By way of example, the determined characteristic could be a transmission speed, cost of transmission, or signal strength of the selected communication mode. Furthermore, the unit may be a battery pack or other accessory device attachable to a wireless telephone handset, or integrated within a mobile unit.

7 Claims, 3 Drawing Sheets

U.S. PATENT DOCUMENTS

| | | |
|---|---|---|
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field et al. |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Loftberg |
| 4,598,272 A | 7/1986 | Cox |
| 4,599,583 A | 7/1986 | Shimozono |
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg |
| 5,043,736 A | 8/1991 | Darnell |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby |
| 5,317,309 A | 5/1994 | Vervelloti |
| 5,331,635 A | 7/1994 | Ota |
| 5,333,175 A | 7/1994 | Ariyavistakul |
| 5,334,974 A | 8/1994 | Simms |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A * | 6/1995 | Sprague et al. .......... 455/556.2 |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| RE35,498 E | 4/1997 | Bernard |
| 5,668,803 A | 9/1997 | Tymes |
| 5,731,757 A | 3/1998 | Layson |
| 5,732,326 A | 3/1998 | Maruyama |
| 5,734,981 A | 3/1998 | Kennedy |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob |
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,781,156 A | 7/1998 | Krasner |
| 5,784,422 A | 7/1998 | Heermann |
| 5,786,789 A | 7/1998 | Janky |
| 5,794,124 A | 8/1998 | Ito |
| 5,796,808 A | 8/1998 | Scott |
| 5,797,091 A | 8/1998 | Clisel |
| 5,804,810 A | 9/1998 | Wolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,841,842 A | 11/1998 | Baum |
| 5,890,108 A | 3/1999 | Yeldener |

| | | |
|---|---|---|
| 5,911,129 A | 6/1999 | Towell |
| 5,917,449 A | 6/1999 | Sanderford |
| 5,945,944 A * | 8/1999 | Krasner ................ 342/357.46 |
| 6,002,363 A * | 12/1999 | Krasner ................ 342/357.52 |
| 6,006,189 A | 12/1999 | Strawczynski |
| 6,018,654 A | 1/2000 | Valentine |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,121,922 A * | 9/2000 | Mohan ................ 342/357.75 |
| 6,122,271 A | 9/2000 | McDonald |
| 6,122,514 A | 9/2000 | Spaur |
| 6,131,067 A | 10/2000 | Girerd |
| 6,131,366 A * | 10/2000 | Fukuda .......................... 53/64 |
| 6,133,874 A * | 10/2000 | Krasner ................ 342/357.63 |
| 6,140,956 A * | 10/2000 | Hillman et al. ........ 342/357.31 |
| 6,144,336 A * | 11/2000 | Preston et al. ......... 342/357.37 |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |
| 6,195,736 B1 | 2/2001 | Lisle |
| 6,208,959 B1 | 3/2001 | Jonsson |
| 6,212,207 B1 | 4/2001 | Nicholas |
| 6,226,529 B1 | 5/2001 | Bruno |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotichini |
| 6,300,875 B1 | 10/2001 | Schafer |
| 6,301,480 B1 | 10/2001 | Kennedy |
| 6,304,186 B1 | 10/2001 | Rabanne |
| 6,304,637 B1 | 10/2001 | Mirashrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 * | 11/2001 | Holland ................... 455/414.2 |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III |
| 6,434,198 B1 | 8/2002 | Tarraf |
| 6,466,582 B2 | 10/2002 | Venters et al. |
| 6,470,046 B1 | 10/2002 | Scott |
| 6,477,633 B1 | 11/2002 | Grimmett |
| 6,493,338 B1 | 12/2002 | Preston |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,611,804 B1 | 8/2003 | Dorbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 * | 1/2004 | Sheynblat et al. ...... 342/357.46 |
| 6,681,121 B1 | 1/2004 | Preston |
| 6,683,855 B1 | 1/2004 | Bordogna |
| 6,690,681 B1 | 2/2004 | Preston |
| 6,690,922 B1 | 2/2004 | Lindemann |
| 6,697,987 B2 | 2/2004 | Lee |
| 6,700,867 B2 | 3/2004 | Classon |
| 6,747,571 B2 | 6/2004 | Fierro |
| 6,754,265 B1 | 6/2004 | Lindemann |
| 6,771,629 B1 | 8/2004 | Preston |
| 6,778,645 B1 | 8/2004 | Rao |
| 6,799,050 B1 * | 9/2004 | Krasner ................... 455/456.1 |
| 6,836,515 B1 | 12/2004 | Kay |
| 6,845,153 B2 | 1/2005 | Tiburtius |
| 6,940,809 B2 | 9/2005 | Sun |
| 6,981,022 B2 | 12/2005 | Boundy |
| 6,993,362 B1 | 1/2006 | Aberg |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,317,696 B2 | 1/2008 | Preston |
| 7,398,100 B2 | 7/2008 | Harris |
| 7,477,906 B2 | 1/2009 | Radic |
| 7,483,418 B2 | 1/2009 | Maurer |
| 7,511,611 B2 | 3/2009 | Sabino |
| 7,512,098 B2 | 3/2009 | Jiang |
| 7,562,393 B2 | 7/2009 | Buddhikot |
| 7,092,370 B2 | 8/2009 | Jiang |
| 2002/0111167 A1 | 8/2002 | Nguyen |
| 2002/0122401 A1 | 9/2002 | Xiang |
| 2003/0016639 A1 | 1/2003 | Kransmo |
| 2003/0073406 A1 | 4/2003 | Benjamin |
| 2003/0147401 A1 | 8/2003 | Kyronaho |
| 2004/0034529 A1 | 2/2004 | Hooper, III |
| 2004/0171370 A1 | 9/2004 | Natarajan |
| 2005/0031097 A1 | 2/2005 | Rabenko |
| 2005/0090225 A1 | 4/2005 | Muehleisen |
| 2005/0111563 A1 | 5/2005 | Tseng |
| 2005/0147057 A1 | 7/2005 | LaDue |
| 2005/0215228 A1 | 9/2005 | Fostick |
| 2005/0226202 A1 | 10/2005 | Zhang |
| 2006/0171368 A1 | 8/2006 | Moinzadeh |
| 2006/0246910 A1 | 11/2006 | Petermann |
| 2007/0087756 A1 | 4/2007 | Hoffberg |
| 2007/0124625 A1 | 5/2007 | Hassan |
| 2007/0264964 A1 | 11/2007 | Birmingham |
| 2008/0025295 A1 | 1/2008 | Elliott |
| 2008/0056469 A1 | 3/2008 | Preston |
| 2008/0132200 A1 | 6/2008 | Shinoda |
| 2008/0143497 A1 | 6/2008 | Wasson et al. |
| 2008/0266064 A1 | 10/2008 | Curran |

FOREIGN PATENT DOCUMENTS

| | | |
|---|---|---|
| DE | 44 24 412 A1 | 1/1996 |
| EP | 0 242 099 A2 | 10/1987 |

| | | |
|---|---|---|
| EP | 0 528 090 A1 | 8/1991 |
| EP | 0 512 789 A2 | 5/1992 |
| EP | 0 501 058 A2 | 9/1992 |
| EP | 0 545 783 | 11/1992 |
| EP | 0 545 783 A1 | 11/1992 |
| EP | 0 545 753 A1 | 6/1993 |
| EP | 0 580 397 A2 | 1/1994 |
| EP | 0889610 A2 | 1/1999 |
| EP | 0 896 442 A1 | 2/1999 |
| EP | 01 950 402 | 12/2004 |
| GB | 2 290 005 A | 5/1994 |
| JP | 03232349 | 10/1991 |
| WO | 89/12835 | 12/1989 |
| WO | 91/07044 | 5/1991 |
| WO | 95/21511 | 8/1995 |
| WO | 96/07110 | 3/1996 |
| WO | 96/15636 | 5/1996 |
| WO | 96/18275 | 6/1996 |
| WO | WO9834164 | 8/1998 |
| WO | WO9834359 | 8/1998 |
| WO | 98/53573 | 11/1998 |
| WO | 98/59256 | 12/1998 |
| WO | 98/59257 | 12/1998 |
| WO | 99/56143 | 4/1999 |
| WO | 99/56144 | 4/1999 |
| WO | 99/36795 | 7/1999 |
| WO | 99/49677 | 9/1999 |
| WO | 00/11893 | 3/2000 |
| WO | 01/78249 A1 | 10/2001 |
| WO | 01/99295 A2 | 12/2001 |
| WO | 02/054694 A1 | 7/2002 |
| WO | 03/034235 A1 | 4/2003 |

OTHER PUBLICATIONS

"Tracking," published on the Internet at http://www.wisetrack.com/tracking.html, posted May 29, 2002, Copyright 2001 by TVL, Inc.
Office Action dated Apr. 9, 2003 in U.S. Appl. No. 09/625,159; 15 pages.
Office Action dated Oct. 16, 2001 in U.S. Appl. No. 09/677,486; 9 pages.
3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.
U.S. Appl. No. 60/047,034 dated May 19, 1997; Applicant—Preston.
U.S. Appl. No. 60/047,140 dated May 20, 1997; Applicant—Preston.
U.S. Appl. No. 60/048,369 dated Jun. 3, 1997; Applicant—Preston.
U.S. Appl. No. 60/048,385 dated Jun. 3, 1997; Applicant—Preston.
U.S. Appl. No. 60/055,497 dated Aug. 12, 1997; Applicant—Preston.
Bilbao, Alfonso, m-Security (Security and Mobile Telephony), Proceedings of the IEEE 35th Annual 2001, International Carnahan Conference on Security Technology, Oct. 16-19, 2001.
Brian W. Martin, "WatchIt: A Fully Supervised Identification, Location and Tracking System," Proceedings of the IEEE, 29th Annual 1995 International Carnahan Conference on Security Technology, Oct. 1995.
Brown, et al., "A Reconfigurable Modem for Increased Network . . . " IEEE Trans. On Circuits & Systems for Video Technology, vol. 6, No. 2, Apr. 1996, pp. 215-224.
Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.
Coleman et al., Subjective Performance Evaluation of the RPE-LTP Codec for the Pan-European Cellular Digital Radio Sys. Nov. 27-30, 1989, pp. 758-761; 1075-1079, IEEE.
Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, 27-30, Nov. 1989, pp. 1075-1079, IEEE, New York, New York.
PCT International Search Report dated Nov. 27, 2000 for International Application No. PCT/US00/13288.
FCC E911 Order, CC Docket No. 94-102 dated Nov. 23, 1998.
Feher, "Modems for Emerging Digital Cellular-Moble Radio System," IEEE Trans. On Vehicular Technology, vol. 40, No. 2, May 1991, pp. 355-365.
International Search Report and Written Opinion of International Application No. PCT/US07/64443, dated Sep. 15, 2008.
International Search Report for PCT/US06/03416, dated Feb. 5, 2007, 3 pages.
International Search Report for PCT/US00/01157, dated May 23, 2000.
International Search Report for PCT/US00/13288, dated May 15, 2000.
International Search Report for PCT/US01/19845, dated Jun. 22, 2001.
International Search Report for PCT/US01/20021, dated Aug. 21, 2001.
International Search Report for PCT/US01/27238, dated Aug. 30, 2001.
International Search Report for PCT/US02/00996, dated Jun. 24, 2002.
Jain et al., Potential Networking Applications of Global Positioning System (GPS), downloadable at http://www.cis.ohio-state.edu/~jain/papers/gps.htm, pp. 1-40, Apr. 1996.
Janus Technologies, Inc., "ProxTrak Asset Tracking Interface, " copyright 2000 Janus Technologies, Inc., published on the Internet at http://www.janus-tech.com/Products/ProxTrax.html, printed May 29, 2002.
3rd Generation Partnership Project; Technical Specification Group Services and System Aspects Push Architecture (Rel. 6); 3GPP TR23.976; vol. 3-SA2, No. v6.1.0; Jun. 1, 2004; pp. 1-34.
International Preliminary Report on Patentability in PCT/US2006/022985 dated Jan. 3, 2008; 6 pages.
Universal Mobile Telecommunications System (UMTS); Push Architecture (3GPP TR 23.976 version 6.1.0 Release 6); Jun. 2004; 36 pages.

* cited by examiner

METHOD FOR PULLING GEOGRAPHIC LOCATION DATA FROM A REMOTE WIRELESS TELECOMMUNICATIONS MOBILE UNIT

RELATED APPLICATIONS

This application is a continuation of U.S. patent application Ser. No. 11/559,811, filed Nov. 14, 2006, which is a divisional application of U.S. patent application Ser. No. 10/016,631, filed Nov. 1, 2001, now U.S. Pat. No. 7,215,965, both hereby incorporated by reference.

BACKGROUND

This disclosure relates to wireless communication, and more particularly to acquiring location data of a remote wireless telecommunication unit.

Some wireless telephone users need to send or receive digital data. Such data may include computer data files, stock quotes, personal calendar data, business contact information, and innumerable other data subjects. Existing wireless telephone users are able to transmit such data, but with limitations on the transmission speed, economy, and location.

There are several different modes of wireless data transmission, with new alternative modes expected to be developed and implemented as technology progresses. Current modes include packet data transport modes such as SMS (Short Message Service), 1XRTT (Multi-Carrier 1X), GPRS (General Packet Radio Services), 3XRTT (Multi-Carrier 3X), and UMTS (Universal Mobile Telecommunication System), EDGE (Enhanced Data rates for GSM and TDMA Evolution), CDPD (Cellular Digital Packet Data) and BlueTooth. Various of these are adapted for use in conjunction with the various digital cellular voice transmission mode such as CDMA, GSM, and TDMA.

While of each of these is reasonably effective where implemented, no one mode is superior in all areas and instances. Even where a region is covered by one mode, there are localized areas where coverage is weak or unavailable. Thus, conventional digital cellular modems using any one mode are of limited use on some occasions when needed. The typical mode is for the user to employ a CDPD modem, which operates in only one mode.

To reduce the disadvantages of being tied to a single mode, one system employs the WAP (Wireless Access Protocol) communication standard and SMS. If a user fails to achieve digital data communication by the default mode of the handset, the user may manually select the alternate mode, and attempt to communicate in hopes that the second mode is effective. This is essentially a back up for when failure occurs, and is often an inconvenience to the user. Moreover, a marginal transmission may in fact occur with the first mode, but at relative high cost (either to the user or the carrier, such as when bandwidth is restricted), at relatively low speed, or with possible corruption of data. This marginal transmission may occur while the back-up mode was able to provide much better service, with that opportunity being lost because the user never was aware (in the absence of a complete failure of the primary mode) of the benefits of switching to the back up mode.

This system has the additional disadvantage in that it is incorporated into a hand set. Thus, as voice or data transmission technologies change, the entire handset may become obsolete, even when one aspect remains effective. In addition, a user opting to upgrade to data capability after owning a conventional handset must discard the handset.

One type of digital data transmission is location data, such as provided by a GPS (Global Positioning System) receiver. Hand sets have included GPS capability, although these suffer from the disadvantage noted above in that one aspect of the unit may become obsolete before the other. In the case of expensive GPS circuitry, a user may occasionally wish to upgrade a telephone, except that the appreciable investment in a still-current GPS unit makes an upgrade unaffordable. GPS units have been used in conjunction with wireless handsets to collect and transmit GPS location data to a call center, which converts the data to a useful format such as a graphical GIF image, and transmits the image for viewing on the handset's display screen. While useful in some circumstances, this has limited use in transmitting the information to other remote units, or for actuation of location functions from anyone but the holder of the handset.

The present inventors have recognized a need for an improved method, device, and system for wireless communication of digital data that employs a mobile unit having a number of alternative transmission modes of digital wireless communication. The unit may be a battery pack or other accessory device attachable to a wireless telephone handset in some embodiments. The mobile unit is operated to assess some characteristic of each of the alternative transmission modes, and based on the assessment, a preferred mode is determined. Data is transmitted via the preferred mode. The unit may include a GPS locator, so that the transmitted data may include the location of the unit. A call center is connected via the Internet Protocol and/or through the Public Switch Telecommunication Network, and receives the data for processing, such as to return information to the user about the location.

DETAILED DESCRIPTION OF PREFERRED EMBODIMENTS

The following description and drawings proceed using terminology that is typically expressed with acronyms and abbreviations best understood by the following glossary:

| Cellular Network 1st Generation: | |
|---|---|
| AMPS | Advance Mobile Phone System |
| *Cellular Network 2nd Generation:* | |
| SMS | Short Message System |
| WAP | Wireless Application Protocol |
| CDMA | Code Division Multiple Access |
| TDMA | Time Division Multiple Access |
| GSM | Global System for Mobile |
| CDPD | Cellular Digital Packet Data |
| *Cellular Network 2.5 Generation:* | |
| 1XRTT | Multi-Carrier 1X (specific to CDMA only) |
| GPRS | General Packet Radio Services (GSM and TDMA) |
| *Cellular Network 3 Generation:* | |
| 3XRTT | Multi-Carrier 3X (specific to CDMA only) |
| UMTS | Universal Mobile Telecommunication System (specific to |

-continued

| | |
|---|---|
| | GSM and GPRS migration) |
| EDGE | Enhanced Data rates for GSM and TDMA Evolution |
| | Internet Protocol: |
| TCP-IP | Transport Control Protocol - Internet Protocol |
| | Telecommunicatiion terms: |
| LEC | Local Exchange Carrier |
| PSTN | Public Switch Telecommunication Network |
| | Wireless Network |

Figure 1:
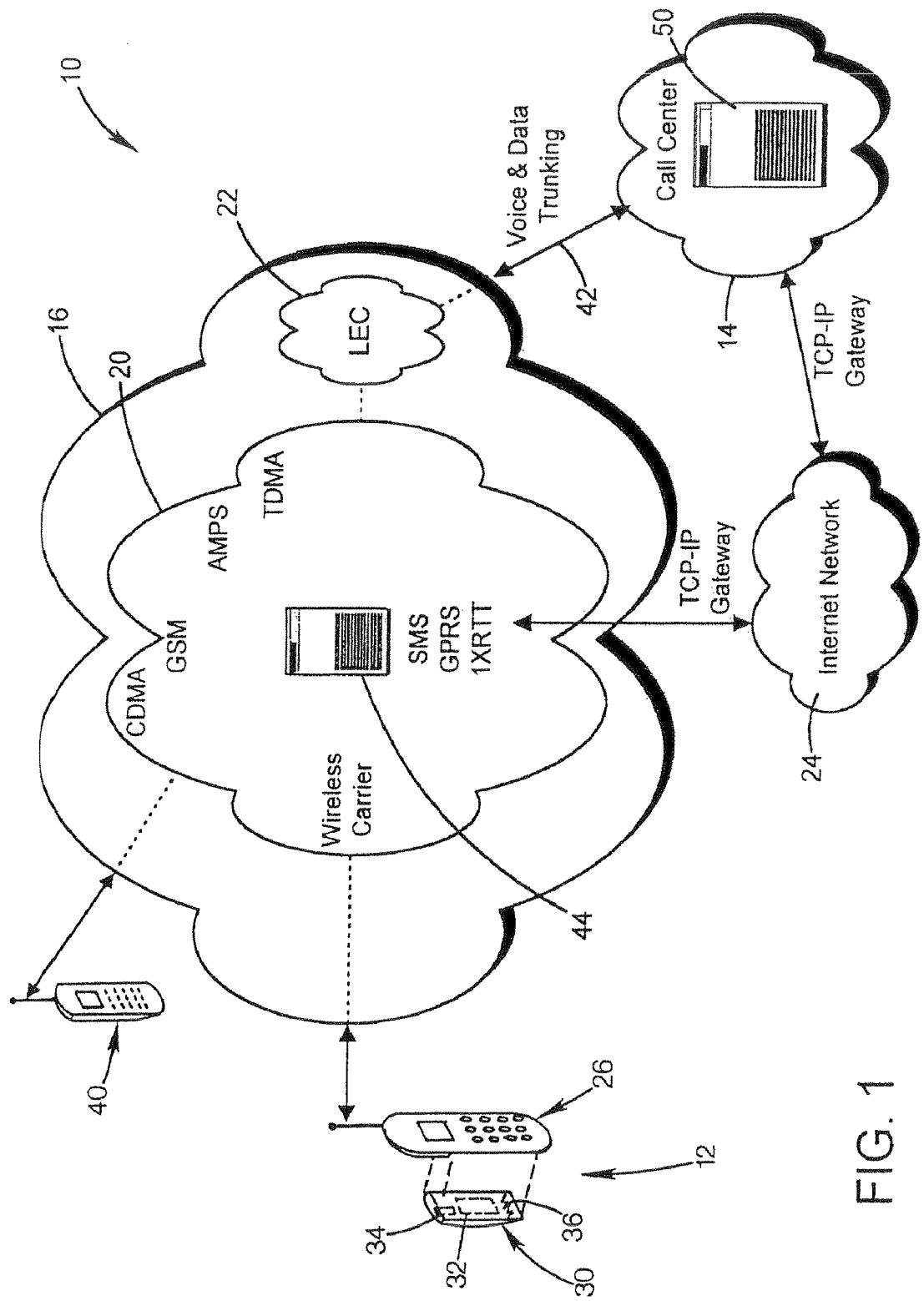
FIG. 1 is a high-level block diagram showing the environment in which the facility preferably operates.

Blue Tooth, a 2.4 Ghz short range radio transceiver protocol
802.11, a 2.4 Ghz protocol used for wireless internet
HomeRF, a 2.4 Ghz wireless internet access protocol FIG. 1 shows a telecommunications system 10 in which a portable handset 12 communicates with a call center 14. A telecommunication network 16 includes a wireless carrier network 20 connected to a Local Exchange Carrier (LEC) 22, and to an Internet network 24.

The handset 12 includes a conventional digital cellular telephone 26 and a detachable accessory module 30. The accessory module may include a battery or attached to a battery pack by some means or interfaces directly to the phone via the cellular communication interface bus, hence not needing to have a battery. The accessory module includes a Global Positioning System (GPS) circuit 32, which includes an antenna for receiving radio signals broadcast from a network of GPS satellites to identify the location of the module. A user-actuated button 34 on the exterior of the module triggers the circuitry to collect the location data, which is gathered in an initial format that requires processing to convert it into a useful form that may be read by the user. An electrical connector 36 on the accessory interfaces with a connector on the handset to transmit the GPS data to the handset for transmission to the wireless network. In alternative embodiments, the accessory may lack the GPS functionality, but have other functions that generate, receive, and or collect digital data. This may include conventional modem cards that receive data from a personal computer, personal data assistant (PDA) modules that store address and calendar information, cameras, biometric transducers and other type of data generating devices. By placing the non-telephone functionality in the accessory, a user may add the functionality after acquiring a phone, and may switch among wireless providers using different communications modes without abandoning the accessory.

The Wireless network 20 operates using a set of geographically-distributed transceiver stations that may have the capability to communicate by way of any of numerous alternative communication protocols or modes using radio frequency bands. In addition to analog modes, there are numerous digital modes. These include iDEN, CDMA, GSM, AMPS, and TDMA. In addition, there are several digital data packet transport modes such as SMS, GPRS, and 1XRTT, which are used for transmission of digital data, as opposed to the transmission of acoustic voice patterns in a digital format. The wireless network will generally employ several, but not all, of the modes. For instance, a typical CDMA system would support voice, and for data it would support SMS and/or 1XRTT as communication modes, but it would not support GPRS. Regardless of which and how many different modes the system can employ, there is at least one voice transmission mode, and one packet data mode, so that the user may use his phone handset conventionally for voice calls, or for data transmission. Other handsets 40 are also operable to connect to the wireless network, so that they may communicate with the call center, or provide voice or data communication among two or more handsets.

The wireless carrier network is connected to the Local Exchange Carrier 22, so that wireless calls from the network are transmitted along conventional land lines 42 to all other possible telephone users, including the call center 14. While it is generally preferable to use "hard wire" or land lines to transmit calls, some wireless communication may be employed in addition to the connection between the first handset and the wireless network. For instance, the call center 14 may connect to its own associated wireless network, or may be connected to the same network in the manner of phone 40. Nonetheless, line 42 represents any line or mode of voice communication that may normally be employed for conventional communication of acoustic signals, such as voice calls, modem tones, and the like, whether transmitted in analog format or encoded in digital format.

The wireless carrier network is also connected to the Internet network 24 via a conventional TCP-IP or other connection useful for high speed data transmission. The wireless network includes a packet data transport server 44 that is connected within the wireless network to receive selected calls from remote handsets, and to convert the call data to a useful format that may be transmitted via the Internet to the Call Center 14. The packet data server is adapted to convert one of the packet data communications modes such as SMS, GPRS, and 1XRTT. Other servers may be used in the same wireless system to convert additional modes, so that a choice of packet data modes may be offered to a user in the geographical area of the wireless carrier.

The call center includes a call center server 50 connected to the LEC via line 42, and to the Internet 24. The call center server operates to receive data from the user's handset accessory 30, and processes it into a useful format that is either used by personnel or other systems in the call center, or transmitted back to the user for use by the user. The call center operates for two way communication over both the voice and data lines illustrated. The detailed functional capabilities and options for the call center will be discussed below.

Figure 2:
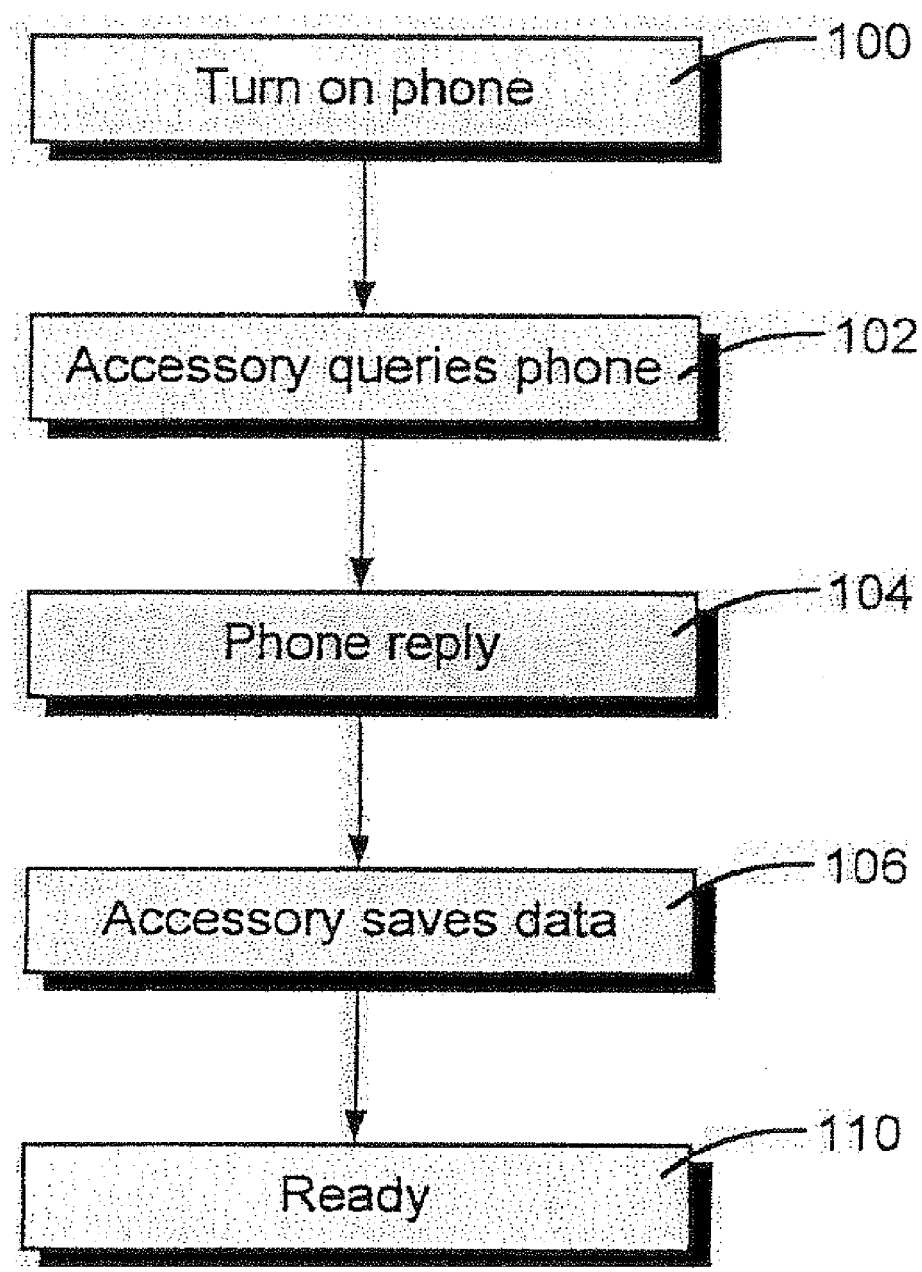
FIG. 2 is a flow chart illustrating operation according to a preferred embodiment.

FIG. 2 shows the steps for initialization of the accessory 30. In step 100, the user turns on the telephone 26, which provides power to the accessory for operation to begin. In step 102, the accessory queries the phone to determine which communications modes the phone supports. This includes possible analog and/or digital voice communication modes, and data transmission and receipt modes such as packet data modes. In the preferred embodiment, the phone will offer at least one voice mode and at least one packet data mode. In step 104, the phone replies to the accessory's query its the phone's transmission capability such as:

| Voice | Digital coverage | |
|---|---|---|
| SMS | Enable | Coverage |
| GPRS | Enable | No Coverage |

Consequently, the accessory has a good understanding of the phone's transmission capabilities and can use any of them based on its configured preference. In step 106, the accessory receives the phone information, and saves it to a transport policy management table in a storage device in the accessory, so that the accessory knows what format of data may be readily used by the phone for transmission via the network to the call center, and is ready to send data per step 110. Once the accessory has saved the identity of the available data transmission mode(s) (a.k.a. phone transport medium), in advanced embodiments, the user may configure the device to generate a particular data type suited to a selected mode. For instance, the user can configure the accessory to use the phone's voice capability when he dials 911, because this is the most readily available transport medium. The user can further configure the accessory to use GPRS when using his credit card to purchase an item, this mode of transmission is of higher bandwidth and allows quick validation. Similarly, this method could be use to download stock prices and other financial data. In some embodiments, this capability may be accessed via a computer or hand held device such as a PDA, which may have an input device and display with greater capabilities than that of the phone or accessory.

Figure 3:
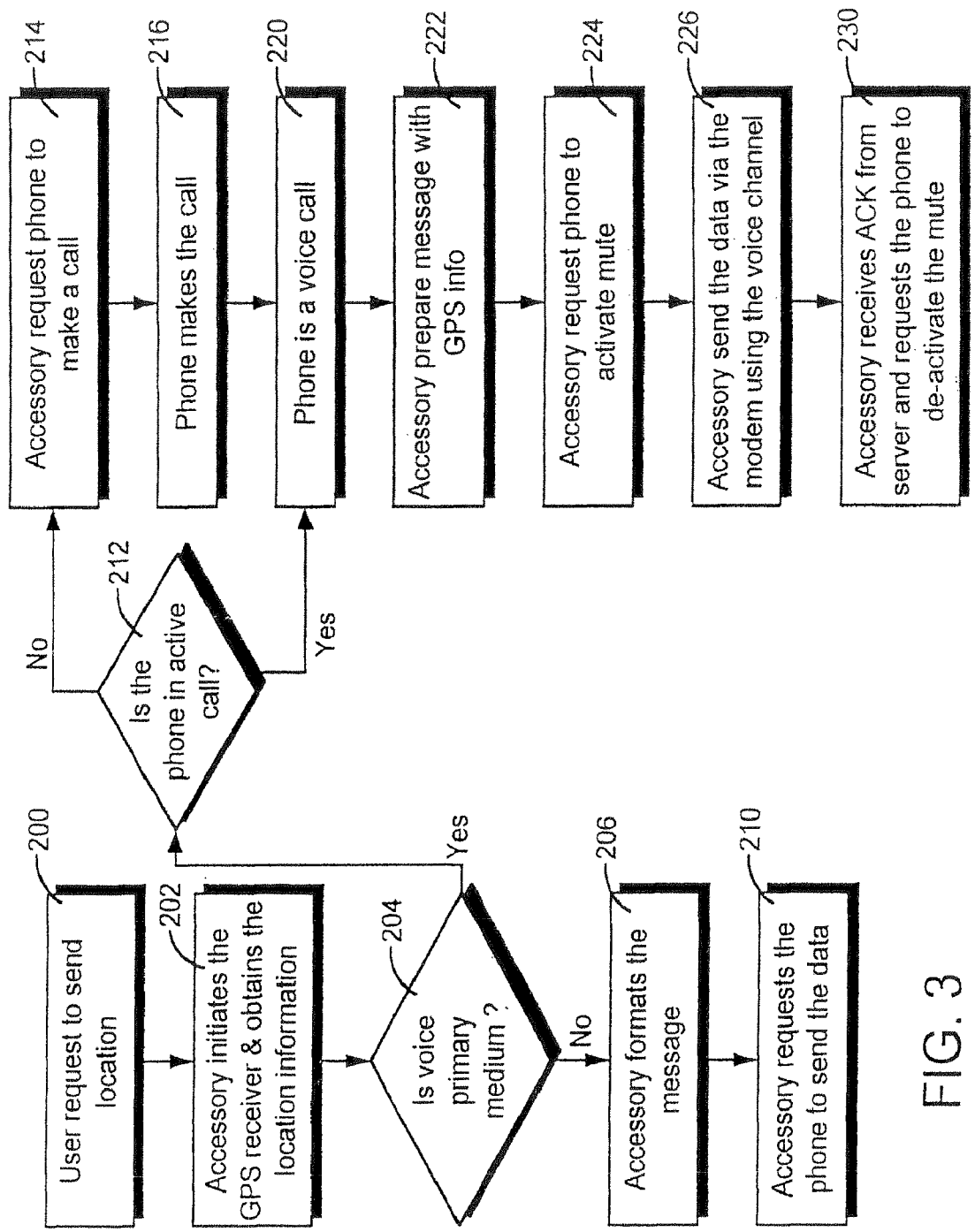
FIG. 3 is a flow chart illustrating operation according to a preferred embodiment.

FIG. 3 shows the operation of the accessory in an instance in which the user wishes to send information about his location to the call center. In step 200, the user initiates a request to transmit his location. This is initiated by actuation of the button 34 on the accessory or via an SMS-like message sent to the accessory from the handheld device such as PDA, PC or pager, or initiated by the Call Center. In response, in step 202, the accessory activates the GPS circuitry to receive GPS signal data from the GPS satellites, and stores this data in the accessory memory circuitry. In the accessory, the GPS receiver converts this data to a Reverse-Geo text format which may contain: latitude, longitude, Dilution of Precision (the accuracy of the position solution, also known as DOP), heading, (i.e. the inferred direction of motion of the user based on prior cells in which the user was located), altitude, or pseudo range (i.e. the raw distance between the GPS accessory, in this case, and the GPS satellite which would include geo-spatial errors), geo fencing criteria (such as whether the user is within a predetermined geographical boundary), and NMEA sentence output (National Marine Electronics Association standard positioning data format). Inasmuch as additional location information may be desired by the users, the data is sent to the call center for processing.

In step 204, the accessory circuitry determines whether voice is the primary medium. This means determining whether the phone's voice transmission mode is capable of data transmission, and if so, whether the voice mode is preferable to an alternative packet data mode that may be available. This determination of which mode is preferred is based on any of a range of criteria to be discussed below. If it is determined that voice is not the primary medium, either because voice is not suitable for data transmission, or because the data mode is determined to be preferred, the accessory circuitry in step 206 then formats the message for the packet mode that has been determined in steps 102, 104, 106 to be available. In the preferred embodiment example, SMS is employed, although any other packet mode or other data transmission protocol may be employed, as may any other mode of data transmission. In step 210, the accessory requests the phone to send the formatted data via the selected transport mode. This is achieved by transmitting through the accessory-phone connector conventional commands, such as AT commands, modem code/tones corresponding to the commands and message content.

If, in step 204, it is determined that voice is the primary transmission mode, the accessory circuitry then determines in step 212 whether the phone is in the midst of an active call. That is, whether the user is "on the phone" or the phone is in talk mode. If not, then in step 214 the accessory requests the phone to call a selected phone number, using the voice communications mode available. The selected number is stored in the Transport Policy Management table stored in the accessory, and corresponds to the call center. In step 216, the phone makes the call, upon which the phone is connected in a call in step 220.

If the phone is determined in step 212 to already be in the midst of a call, it proceeds directly to step 220. While connected to the call center (or to the destination to which a call is already placed), the accessory prepares a message including the GPS location information in a transmissible format, such as using AT codes. Then, in step 224, the accessory commands the phone to activate a mute function, so that the call is muted briefly. During the mute interval, in step 226, the accessory sends the GPS data encoded via its modem circuitry using the voice channel. Essentially, the phone mutes the pre-existing call, and uses the existing voice call to the call center to transmit the data. This occurs during an adequately brief interval that it does not impair a conversation on the voice line. In addition, measures may be taken to buffer incoming and outgoing voice signals, so that they may be time-compressed and replayed immediately after the hold interval to avoid minimal loss of words or syllables. In step 230, the Call Center Server sends an acknowledgement signal back to the phone when the end of the sent data string has been received. This triggers the phone to de-activate the mute function, so that any pre-existing call may continue.

With the call center having the user's GPS data, it then processes this data to determine the user's location. Typically, this will yield a Latitude-Longitude location, or a definite location under another coordinate system. Such a location may be converted to any other useful format. Alternative formats include nearest street address, graphical representation on a map, and the like. This information may be sent back to the user by similar channels as the data was transmitted to the call center. The information may be in a readable text format (such as for nearest address), graphical format (for transmission of a map image) or acoustic format (for dictated directions or location information.)

The accessory achieves advantages by selecting from among several alternative communications modes. The selection may alternatively be made by the call center, because it may possess information that allows the optimization of mode selection. In either event (or if both the accessory and call center contribute data to the mode decision), a wide range of criteria may be used to determine the mode. Factors may include: the availability of bandwidth of alternative modes, the speed of transmission (elapsed time to transmit), the criticality of data to be transmitted, the robustness against data errors, the least cost, present availability, latency inherent from the network available resources or lack of the base station signal strength to the cellular phone, user preferences, cellular carrier preference, data type (i.e. credit card number) and cellular roaming status. Algorithms may be applied that consider multiple of these factors. For example, a preferred algorithm may entail: including encryption and compression to maximize the throughput and ensure security of the critical data.

The system may also optionally be set up to operate without any intervention by the user. The call center, or another user remote from the handset, may initiate a query of the handset of its location. A session is initiated by the call center to the handset via SMS, GPRS message or using an actual voice call, and a string of control codes triggers the GPS unit to download location information, which may be transmitted as discussed above. This information may then be reported to another location. For instance, a parent may query a handset carried by a child, to monitor the child's location. Other applications include monitoring of transportation, delivery, or emergency personnel for dispatch purposes. The nearest taxi, police cruiser, or delivery van may be dispatched to a desired location to reduce mileage costs and to speed up service.

The system may also operate for "geographical fencing" of the accessory. This entails programming the accessory to generate a communication when the GPS data indicates that it has departed from the boundaries of a pre-determined area. This may be used to prevent theft, to improve personnel efficiency and reliability, or for other purposes. As with the systems noted above, the location information may be transmitted to the call center for processing, or may be transmitted to a third party.

The GPS function may be aided by the wireless capabilities of the telephone handset. To improve accuracy, or to provide at least approximate location when out of GPS signal range, wireless functions may provide location information. Such functions may include cell identity, signal strength, cell sector, Time Of Arrival (TOA) and Enhanced Observed Time Difference (E-OTD). The location data may be supplemented with partial GPS data from less than all needed satellites, including the information of which satellites are in view of the user. All information may be transmitted in raw or limited form to the call center for analysis with the computing power and ephemeris data unavailable at the handset.

While the above is discussed in terms of preferred and alternative embodiments, the invention is not intended to be so limited.

It will be obvious to those having skill in the art that many changes may be made to the details of the above-described embodiments without departing from the underlying principles of the invention. The scope of the present invention should, therefore, be determined only by the following claims.

The invention claimed is:

1. A remote method of determining a geographic location of a wireless mobile unit capable of communicating with a wireless telecommunications network, the method comprising the steps of:
   at the mobile unit, receiving a location query via a wireless telecommunications network serving the mobile unit;
   responsive to the location query, downloading location data from a GPS unit in the mobile unit; and
   transmitting the location data via said wireless telecommunications network
   wherein the mobile unit supports at least two communication modes and further comprising:
      determining what wireless communication modes are currently available to the mobile unit on the network;
      assessing at least one selected characteristic of each of the currently available communication modes;
      based on the assessment, determining a preferred one of the currently available communication modes communication mode to transmit the location data; and
   transmitting the location data via the preferred communication mode.

2. The method of determining a geographic location of a wireless mobile unit according to claim 1 wherein the location query is initiated by a call center.

3. The method of determining a geographic location of a wireless mobile unit according to claim 2 wherein the location query is initiated from the call center via a voice channel call to the mobile unit.

4. The method of determining a geographic location of a wireless mobile unit according to claim 2 wherein the location query is initiated by another user remote from the mobile unit.

5. The method of determining a geographic location of a wireless mobile unit according to claim 1 further comprising:
   processing the location information transmitted by the mobile unit via said wireless telecommunications network; and
   reporting the processed location information to another location remote from the mobile unit.

6. The method of determining a geographic location of a wireless mobile unit according to claim 1 further comprising receiving and processing the transmitted location data at a call center.

7. The method of determining a geographic location of a wireless mobile unit according to claim 1 wherein the selected characteristic is selected from a group of characteristics comprising return signal strength, cost, available bandwidth, transmission speed, user preference, carrier preference, data type and cellular roaming.

* * * * *

UNITED STATES PATENT AND TRADEMARK OFFICE
CERTIFICATE OF CORRECTION

PATENT NO.        : 7,848,763 B2
APPLICATION NO.   : 12/370062
DATED             : December 7, 2010
INVENTOR(S)       : Andre F. A. Fournier et al.

It is certified that error appears in the above-identified patent and that said Letters Patent is hereby corrected as shown below:

Column 8, line 22:  In claim 4, delete "claim 2" and insert --claim 1--, therefor.

Signed and Sealed this
Twenty-first Day of June, 2011

David J. Kappos
*Director of the United States Patent and Trademark Office*